Figure 1:
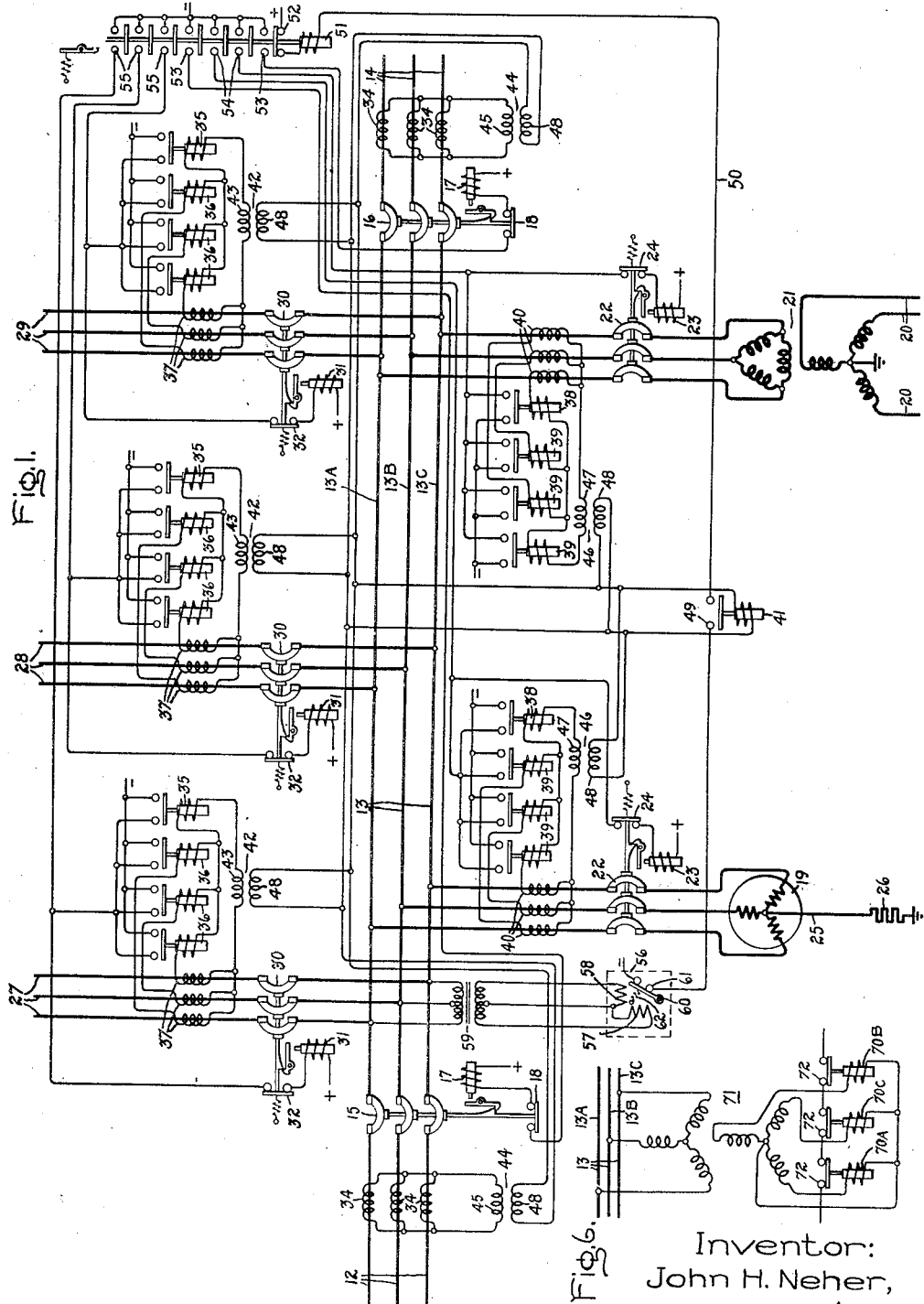

Nov. 28, 1944.  J. H. NEHER  2,363,895
PROTECTIVE SYSTEM
Filed Aug. 5, 1942  2 Sheets-Sheet 2

Inventor:
John H. Neher,
by Harry E. Dunham
His Attorney.

Patented Nov. 28, 1944

2,363,895

UNITED STATES PATENT OFFICE 2,363,895

PROTECTIVE SYSTEM

John H. Neher, Wynnewood, Pa., assignor to General Electric Company, a corporation of New York Application August 5, 1942, Serial No. 453,661

7 Claims. (Cl. 175—294)

My invention relates to a protective system which is particularly applicable to apparatus in which switches, bus bars, and the like are arranged in one or more sections whereby, in the event of trouble in one section, that section may be completely isolated from the rest of the system. Specifically, my invention is an improvement on United States Letters Patent 2,272,991, granted February 10, 1942, upon an application of William M. Hanna, and assigned to the same assignee as the present application.

Various means have been proposed in connection with polyphase alternating-current systems and particularly as to bus-bar protection for reducing or eliminating the possibility of interphase short circuits. For example, the phase conductors and apparatus associated with each phase conductor have been isolated from each other by various means, such as by wide separation thereof in the case of outdoor bus bars or by being separately enclosed in insulating structures in the case of indoor bus bars. While the possibility of interphase short circuits in such systems is almost entirely removed, there still remains the danger, particularly when the system is supplied by a star or Y-connected source having a grounded neutral, of a fault from any phase to ground inasmuch as the various switches, switch-operating mechanisms, bus-insulator supports, current transformers, etc., usually are grounded.

Busses are frequently protected against ground faults by a differential protective system which operates on the basis of the difference between the currents into and from a section of the bus. This arrangement requires a plurality of parallel connected current transformers, one at every point where current is supplied to or taken from the bus. These current transformers must be carefully coordinated as to ratio and capacity characteristics throughout their operating range in order to avoid false operation of the protective relays because of an apparent ground fault current due to ratio departure of the current transformers. Any attempt to avoid this false operation by raising the relay settings seriously impairs the quality of the protection. Because of the difference in capacity and ratio of the feeder and bus current transformers, it is practically impossible to coordinate current transformers with any reasonable degree of certainty or economy. In consequence of this, even though there is a balance between the actual power currents into and from the bus especially under fault conditions external of the bus, these currents as reflected in the current transformer secondary windings produce an apparent difference which tends to and may cause incorrect relay operation resulting in the isolation of a sound bus section which is very undesirable.

In order to prevent the ground fault relays from tripping on apparent ground fault currents due to external faults, it has been suggested to connect the contacts of the ground fault relay protecting the particular bus section in series with contacts of another relay responsive to the current flowing in the grounded neutral of the star or Y-connected source supplying this bus section. The relay equipment by this arrangement, therefore, can easily distinguish the difference between external phase faults and internal short circuits. Any fault not involving ground in such an arrangement prevents the relay associated with the grounded neutral from closing its contacts and, therefore, even though apparent fault currents cause energization of the ground fault relay, tripping of the circuit breakers will not occur.

It is known, however, that double line-to-ground short circuits external of the protected bus section, such as on a feeder, for example, will cause a current to flow in the grounded neutral of the star or Y-connected source feeding the bus bar so that the relay associated therewith closes its contacts. Furthermore, since the interphase component of this double line-to-ground fault current may be many times higher than the ratings of the current transformers of the associated protective system, these current transformers will saturate and probably indicate an apparent ground fault current in the residual circuit so as to cause the ground fault relay to close its contacts whereby isolation of the bus section occurs even though the fault is external thereto. If the external fault happened to be only a single line-to-ground fault, isolation of the sound bus section would not occur even though the relay associated with the ground circuit of the Y-connected source supplying the bus were to close its contacts because the relatively high impedance in this ground circuit limits the fault current whereby the current transformer inaccuracies are ineffective to cause sufficient apparent ground current to flow in the ground fault relay circuit. In fact, it is quite customary to provide a ground impedance having such a value that the ground fault current is less than twice normal load current, in which case the errors of the current transformers would be very small.

In view of the ground fault impedance referred to above, the differential relay will operate correctly on any single line-to-ground fault or short circuit and, since it is presumed that suitable protection is provided against faults involving two or more phases, my invention relates to a system for rendering the ground differential relay inoperative when faults occur involving two or more phases and, more specifically, to a system for distinguishing between a double line-to-ground fault either external or internal and an internal single line-to-ground fault. In the above-mentioned Hanna patent a double line-to-ground fault is distinguished from a single line-to-ground fault by the magnitude of the ground current flowing in the ground circuit associated with the protected section, which circuit will include a high impedance for limiting ground fault currents. It would be desirable to provide means for distinguishing between a double line-to-ground and a single line-to-ground fault without the necessity of relays dependent solely on the magnitude of the current flowing in a grounded neutral circuit.

Accordingly, it is an object of my invention to provide a new and improved protective system which will prevent isolation of a sound bus section due to inaccuracies in the associated current transformers.

It is another object of my invention to provide an improved protective arrangement for bus bars which, in response to system voltage conditions on the occurrence of faults, discriminates between a double line-to-ground and a single line-to-ground short circuit.

Further objects and advantages of my invention will become apparent as the following description proceeds and the features of novelty which characterize my invention will be pointed out with particularity in the claims annexed to and forming a part of this specification.

Figure 2:
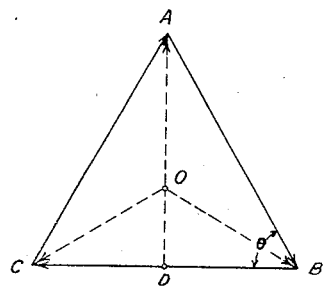
Figure 3:
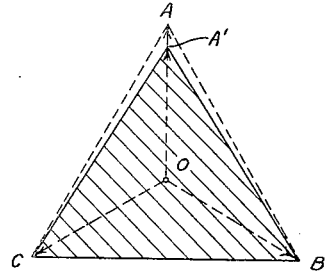
Figure 4:
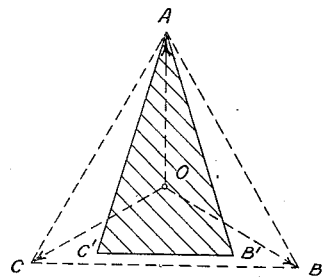
Figure 5:
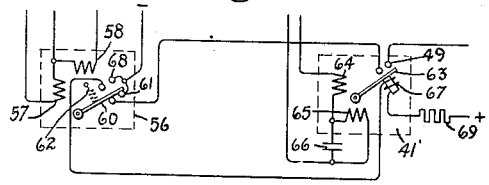

For a better understanding of my invention, reference may be had to the accompanying drawings in which Fig. 1 illustrates schematically a bus bar protective system embodying my invention; Figs. 2, 3, and 4 are vector diagrams to aid in understanding my invention as illustrated in Fig. 1; and Figs. 5 and 6 are partial views of a system similar to Fig. 1 showing modifications of my invention.

Referring now to Fig. 1 of the drawings, I have illustrated my invention as applied to a polyphase alternating-current sectionalized bus system of which three sections 12, 13, and 14 are schematically illustrated. Only one section 13 is shown completely since the others are substantial duplicates as far as my invention is concerned. Although I have illustrated my invention as specifically applied to a bus system, it will be understood by those skilled in the art that other applications are also possible, the bus system having been chosen by way of example only. Bus section 13 is illustrated as a three-phase bus including phase conductors 13A, 13B, 13C. The bus sections 12, 13, and 14 are shown as interconnected by suitable switching means, such as latched closed circuit breakers 15 and 16, each provided with trip coils 17 and an auxiliary switch 18 which is closed when the circuit breaker is closed and open when the circuit breaker is open. Such auxiliary switches are commonly known as "a" switches.

Each bus section, such as 13, for example, may have one or more sources of supply which I have indicated, for example, as a Y-connected generator 19, and a source of power 20 connected to the bus section 13 through a suitable transformer 21. In order to disconnect the sources 19 and 20 from the bus section 13 in case of a fault, suitable switching means such as circuit breakers 22 are provided, each having a trip coil 23 and an auxiliary or "a" switch 24. The neutral of Y-connected generator 19 is provided with a suitable ground connection 25 including an impedance illustrated as a resistance 26 for limiting the ground fault current that may flow.

A plurality of feeders, such as 27, 28, and 29, are connected to bus section 13 through suitable switching means, such as latched closed circuit breakers 30, which are provided with trip coils 31 and auxiliary or "a" switches 32.

Since my invention is particularly concerned with ground fault protection, I have not illustrated the protective apparatus which would be necessary to protect the bus section for interphase faults thereon. However, if the bus comprising sections 12, 13, and 14 were an isolated phase type of installation, the possibility of interphase short circuits is so remote that a protective system for this purpose might not be necessary. If a fault should occur in generator 19, transformer 21, feeders 27, 28, and 29, or bus sections 12 and 14, in other words, an external fault, it is desirable to disconnect such faulted device or apparatus from protected bus section 13. Although many different types of protective systems may be used for this purpose, by way of example, I have illustrated my protective system as provided with overcurrent protection against both phase and ground faults for all of these circuits supplying power to or taking power from bus section 13 except for bus sections 12 and 14 which are preferably of the isolated phase type. In order to obtain differential ground fault protection of bus section 13, however, each of the phases of bus sections 12 and 14 are provided with a current transformer 34, the function of which will be described in greater detail hereinafter.

Each of the feeders 27, 28, and 29 is provided with protection both for phase and ground faults including overcurrent ground fault relays 35 and overcurrent phase fault relays 36 which are arranged to be suitably energized from current transformers 37 associated with the respective phases of feeders 27, 28, and 29. The energization of any of the phase fault relays 36 or ground fault relays 35 on feeders 27, 28, or 29 will energize the respective trip coil 31 through a switch 32 of the associated circuit breaker 30 on the particular feeder wherein the fault condition occurs.

Generator 19 and transformer 21 are also provided with protective apparatus of the overcurrent type identical with that associated with feeders 27, 28, and 29 comprising overcurrent ground fault relays 38 and overcurrent phase fault relays 39 arranged to be energized in the conventional manner from suitable current transformers 40, each associated with one of the phase conductors connected to the respective phase conductors of bus section 13. An abnormal current condition in any of these phase conductors will cause energization of one of the ground fault relays 38 or phase fault relays 39 which, in turn, will cause energization of trip coils 23 through auxiliary or "a" switches 24 whereupon the particular circuit breaker 22 associated with the faulted apparatus is caused to isolate this apparatus relative to the bus section 13.

My invention is particularly concerned with protection against ground faults in bus section 13 and, under such conditions, it is necessary completely to isolate this section by simultaneously tripping sectionalizing circuit breakers 15 and 16, feeder breakers 30, and circuit breakers 22 through which generator 19 and source 20 are connected to the bus section 13. The means for accomplishing one step in the direction of this simultaneous tripping action is shown as a differential ground fault relay 41. Relay 41 is arranged to be energized by a current dependent upon the vector sum of all the currents flowing into and out of the bus section 13. Accordingly, I provide an auxiliary transformer 42 for each feeder circuit 27, 28, and 29 having the primary winding 43 thereof connected in series with the residual circuit including ground fault relays 35 of the feeder protective apparatus. Similarly, a transformer 44 is provided for each of the bus sections 12 and 14 having its primary winding 45 connected to the seconary windings of current transformers 34 associated with the respective bus sections. Also, a similar transformer 46 is provided for each of the protective circuits for generator 19 and transformer 21 having the primary winding 47 thereof connected in series with the associated ground fault relay 38. Each of the transformers 42, the transformers 44, and the transformers 46, includes a secondary winding 48, and these secondary windings are all connected in parallel providing a differential circuit for energizing differential relay 41. Any ground fault in protected section 13 will cause a current to flow in the differential circuit including secondary windings 48 and differential relay 41, thereby causing energization of the latter to close its contacts 49.

The closing of contacts 49 of ground fault differential relay 41 is one step in the direction of controlling the energizing circuit 50 of an auxiliary multiple-contact tripping relay 51 through normally closed contacts 52. This tripping relay 51 when energized closes a plurality of contacts 53, a plurality of contacts 54, and a plurality of contacts 55 connected in the respective circuits of the trip coils 17, 23, and 31 through "a" switches 18, 24, and 32 of the associated circuit breakers whereby to effect a simultaneous tripping operation of all the circuit breakers 15, 16, 22, and 30, respectively. The contacts 53 control the tripping of circuit breakers 15 and 16, the contacts 54 control the tripping of circuit breakers 23, and the contacts 55 control the tripping of circuit breakers 30. As shown, the auxiliary tripping relay 51 is of the hand-reset type, which, upon operating to close its contacts, de-energizes its own circuit at the contacts 52.

I have discovered that, in the case of systems, grounded through relatively high impedances such as the system described above, the so-called "area of the voltage triangle" of the bus is a criterion of whether one or two phase conductors are involved in the fault. By the area of the voltage triangle is meant the area within the triangle formed by the delta voltages or line-to-line voltages of the bus as indicated in Fig. 2 where the vector AB represents the line-to-line voltage between conductor 13A and conductor 13B in Fig. 1, the vector BC the voltage between conductors 13B and 13C, and the vector CA the voltage between conductors 13C and 13A. It is, of course, fundamental that the area of any triangle is equal to one-half the product of its base and its altitude or, with reference to Fig. 2, one-half the product of the vector BC and the altitude AD of the triangle. However, the altitude AD of the triangle is equal to the vector AB multiplied by the sine of the angle $\theta$ between the vector AB and the vector BC. The measurement of a quantity proportional to the area of the voltage triangle may, therefore, be directly obtained by the employment of a product type relay measuring the product of the voltage vectors AB and BC multiplied by the sine of the angle between these vectors. Accordingly, I provide a product type relay 56 including windings 57 and 58, respectively. The windings 57 and 58 are energized from bus section 13 through potential transformer 59 with the line-to-line or delta voltages AB and BC, respectively. Product type relay or electroresponsive device 56 also includes a movable switching member 60 for controlling contacts 61. Switching member 60 is normally biased by spring member 62 to a position in which contacts 61 are open. Under normal voltage conditions of bus section 13, the torque produced on switching member 60 is proportional to the product of the line-to-line voltages AB and BC multiplied by the sine of the angle between them or, in other words, is proportional to the area of the voltage triangle, which torque is sufficient to overcome spring 62 and cause switching member 60 to close contacts 61 as indicated in Fig. 1. The contacts 61 are connected in series with the contacts 49 of differential relay 41 and tripping of the circuit breakers to cause isolation of bus section 13 will occur when contacts 61 of product type relay 56 and contacts 49 of differential relay 41 are simultaneously in the closed position.

When a single line-to-ground fault occurs on the system including bus section 13, such as a ground fault on phase conductor 13A, only a slight decrease AA' in the line-to-ground voltage OA as shown in Fig. 3 occurs by virtue of the current-limiting impedance 26 and, consequently, the voltage triangle ABC of Fig. 3 is decreased only slightly to A'BC or, in other words, the shaded area of Fig. 3. In the event of a double line-to-ground fault, such as a fault between phase conductors 13B and 13C and ground of bus section 13, the voltage triangle has an area as shown shaded in Fig. 4, which is considerably less than the area of the voltage triangle under a single line-to-ground fault as indicated in Fig. 3. Consequently, product type relay 56, which produces a torque proportional to the area of the voltage triangle of the system including bus section 13, will be designed to produce a torque sufficiently large to overcome the force of spring means 62 when a small change in the area of the voltage triangle occurs and maintains contacts 61 in the closed position. On the occurrence of a double line-to-ground fault, however, a large reduction in the area of the voltage triangle results and this collapse of the area of the voltage triangle is such that the force of spring 62 is no longer overcome whereby contacts 61 are opened thereby preventing tripping on double line-to-ground faults regardless of whether or not differential relay 41 closes its contacts.

The operation of the protective system illustrated in Fig. 1 will be understood by those skilled in the art in view of the detailed description included above. Due to the operation of relay 56, which distinguishes between a double line-to-ground fault and a single line-to-ground fault on the basis of the area of the voltage triangle formed by the line-to-line voltage vectors, a double line-to-ground short circuit will cause contacts 61 to open and render differential relay 41 ineffective to cause isolation of bus section 13 even though contacts 49 of differential relay 41 are closed. This is true whether differential relay 41 operates properly in response to an internal double line-to-ground short circuit or improperly by virtue of the apparent ground-fault current due to current transformer inaccuracies on external double line-to-ground short circuits. Consequently, isolation of bus section 13 in Fig. 1 can only be caused by a single line-to-ground short circuit and, if the bus is of the isolated phase type, this is the only protection that is needed. If interphase faults can occur on bus section 13, a protective system will be provided, as mentioned hereinbefore, which will completely isolate bus section 13 on an internal double line-to-ground fault and which will not cause operation of the ground fault protective system of my invention.

It may happen that, following the clearing of an external double line-to-ground fault by operation of relays other than those shown in Fig. 1, switching member 60 of relay 56 might reclose contacts 61 before the contacts 49 of differential relay 41 which has been operated by false differential currents have been opened, in which case, undesirable isolation of bus section 13 would result. To prevent any undesirable race between the contacts of these two relays, it may be desirable to modify the construction thereof slightly as indicated in Fig. 5, which shows a portion of the protective system in Fig. 1, designated by the same reference numerals as in Fig. 1. The differential relay in this case has been indicated as a product-type relay 41' including a switching member 63 adapted to bridge contacts 49 identical with the contacts 49 of relay 41 of Fig. 1. A plurality of windings 64 and 65 are provided which are serially arranged and energized across the differential circuit in the same manner as the winding of relay 41 of Fig. 1. A suitable phase-shifting capacitor 66 is provided across winding 65 so that an operating torque may be produced by the interaction of the fluxes produced by current flowing in windings 64 and 65. A suitable holding coil 67 is provided adjacent switching member 63 which is so designed that, whenever this holding coil is energized, switching member 63 will be moved to the open position with reference to contacts 49 even though, without such energization of holding coil 67, the current flowing in windings 64 and 65 would cause switching member 63 to close contacts 49.

In order to energize holding coil 67, I connect it in series with back contacts 68 on relay 56 and a current-limiting resistor 69 across a source of direct-current potential as indicated. With this arrangement, a double line-to-ground fault will cause contacts 61 of relay 56 to be opened and the back contact 68 to be closed, whereupon holding coil 67 is energized to prevent differential relay 63 from operating to close contacts 49. With this arrangement, there is no possibility of undesirable operation of bus section 13 immediately following the clearing of an external double line-to-ground fault by closing of contacts 61 prior to the opening of contacts 49.

Although in Figs. 1 and 5 I have illustrated the use of a product-type relay 56 for directly measuring the area of the voltage triangle formed by the line-to-line voltages of the system, it is also possible to measure this area indirectly by the use of three undervoltage relays indicated as 70A, 70B, and 70C in Fig. 6, showing a part of bus section 13 of Fig. 1 designated by the same reference numerals as in Fig. 1. These undervoltage relays are energized from bus section 13 with line-to-neutral voltages through a suitable Y—Y potential transformer 71. The contacts 72 of the undervoltage relays 70A, 70B, and 70C, respectively, are connected in series with one another and in series with the contacts 49 of differential relay 41, not shown in Fig. 6, so that the arrangement illustrated in Fig. 6 merely replaces the potential transformer 59 and the relay 56 of Fig. 1. The undervoltage relays 70A, 70B, and 70C are so designed as to be energized under normal conditions of bus section 13 to close their respective contacts 72. Under a single line-to-ground fault, the line-to-neutral voltage OA as shown in Fig. 3 decreases only slightly to OA' with a system such as shown in Fig. 1 having a high grounding impedance 26 and, consequently, all of the undervoltage relays 70A, 70B, and 70C remain energized to maintain their contacts in the closed position. On a double line-to-ground fault, on the other hand, or on a fault involving more than one phase conductor, one or more of the undervoltage relays 70A, 70B, or 70C will drop out to cause opening of the associated contacts 72, thereby rendering ineffective differential relay 41 in the same manner as the operation of product-type relay 56 described above.

If it should be desired to use the undervoltage relay arrangement disclosed in Fig. 6 with the product-type differential relay 41' of Fig. 5 including holding coil 67, then each of the undervoltage relays could be provided with back contacts connected in parallel with one another so that the deenergization of any one of the undervoltage relays 70A, 70B, or 70C would cause energization of the holding coil 67 in the same manner as was described in connection with Fig. 5.

While I have shown and described certain particular embodiments of my invention, it will be apparent to those skilled in the art that my invention has other applications and that changes and modifications may be made without departing from the spirit and scope of my invention. I therefore aim in the appended claims to cover all such modifications and changes.

What I claim as new and desire to secure by Letters Patent of the United States, is:

1. A protective system for causing isolation of any unsound section of a polyphase alternating current circuit on the occurrence of fault conditions thereon including means for deriving a current dependent upon the vector sum of currents supplied to and leaving said unsound section, and means responsive to the area of the voltage triangle of said circuit for distinguishing between double line-to-ground and single line-to-ground faults on said circuit for initiating the operation of said protective system only when said last-mentioned type of fault occurs.

2. In a protective system for an electric circuit subject to the occurrence of fault conditions thereon, switching means for isolating a portion of said circuit on the occurrence of a fault condition thereon, and means dependent upon the area of the voltage triangle of said circuit for distinguishing between double line-to-ground and single line-to-ground faults on said circuit for controlling the operation of said switching means.

3. In an alternating-current electric system comprising a sectionalized bus, a plurality of feeders connected to one section of said bus, and means for supplying alternating current to a plurality of sections of said bus, an arrangement for isolating said one section on the occurrence of a fault thereon including means for deriving a current dependent on the vector sum of all the currents flowing into and out of said section, a relay responsive to said derived current tending to initiate the isolation of said section, and means responsive to the area of the voltage triangle of said circuit for preventing said relay from causing isolation of said section except upon the occurrence of a single line-to-ground fault thereon.

4. In an alternating current electric system comprising a polyphase alternating-current sectionalized bus, a plurality of feeders connected to one section of said bus, a Y-connected source of electrical energy having a grounded neutral for supplying alternating current to said section, and a plurality of switching means for isolating said section upon the occurrence of a fault condition thereon, a protective system for said bus comprising means for deriving a current dependent upon the vector sum of all the currents into and out of said section, a relay responsive to said derived current tending to initiate the simultaneous operation of said switching means for isolating said section, and means responsive to the area of the voltage triangle of said circuit for distinguishing between single line-to-ground and double line-to-ground faults on said bus section for preventing said relay from causing isolation of said section except upon the occurrence of said first-mentioned type of fault thereon.

5. In an alternating current electric system comprising a polyphase alternating-current sectionalized bus, a Y-connected source of electrical energy having a grounded neutral for supplying alternating current to one section of said bus, a plurality of feeders connected to said section, and switching means for isolating said section upon the occurrence of a fault condition thereon, a protective system for said bus comprising means for deriving a current dependent upon the vector sum of all the currents into and out of said section, a relay responsive to said derived current including a pair of contacts, a second relay responsive to a voltage quantity of said circuit including a plurality of contacts, said first and second-mentioned relay contacts being connected in series in a circuit for controlling the simultaneous tripping of all of said switching means for isolating said bus section, said last-mentioned relay being so constructed and arranged to distinguish between single line-to-ground and double line-to-ground faults on said bus section so that isolation of said section will be accomplished only upon the occurrence of said first-mentioned type of fault thereon.

6. In an alternating current electric system comprising a polyphase alternating-current sectionalized bus, a Y-connected source of electrical energy having a grounded neutral for supplying alternating current to one section of said bus, a plurality of feeders connected to said section, and switching means for isolating said section upon the occurrence of a fault condition thereon, a protective system for said bus comprising means for deriving a current dependent upon the vector sum of all the currents into and out of said section, a relay responsive to said derived current including a pair of contacts, a second relay responsive to the area of the voltage triangle of said bus including a plurality of contacts, said first and second-mentioned relay contacts being connected in series in a circuit for controlling the simultaneous tripping of all of said switching means for isolating said bus section, said last-mentioned relay being so constructed and arranged to distinguish between single line-to-ground and double line-to-ground faults on said bus section so that isolation of said section will be accomplished only upon the occurrence of said first-mentioned type of fault thereon, and means for preventing any race between the contacts of said relays which might cause undesirable operation of said switching means.

7. In an alternating-current electric system comprising a sectionalized bus, a plurality of feeders connected to one section of said bus, and means for supplying alternating current to a plurality of sections of said bus, an arrangement for isolating said one section on the occurrence of a fault thereon including means for deriving a current dependent upon the vector sum of all the currents flowing into and out of said section, a relay responsive to said derived current tending to initiate the isolation of said section, and means including a product type electroresponsive device for preventing said relay from causing isolation of said section except upon the occurrence of a single line-to-ground fault thereon, said electroresponsive device being connected to said sectionalized bus so that a torque is produced thereon proportional to the product of two line-to-line voltages of said bus multiplied by a function of the angle between said voltage.

JOHN H. NEHER.